E. C. & L. B. JONES.
METHOD OF MANUFACTURING ILLUMINATING GAS FROM LIQUID HYDROCARBONS.
APPLICATION FILED MAY 23, 1912.
1,157,225. Patented Oct. 19, 1915.
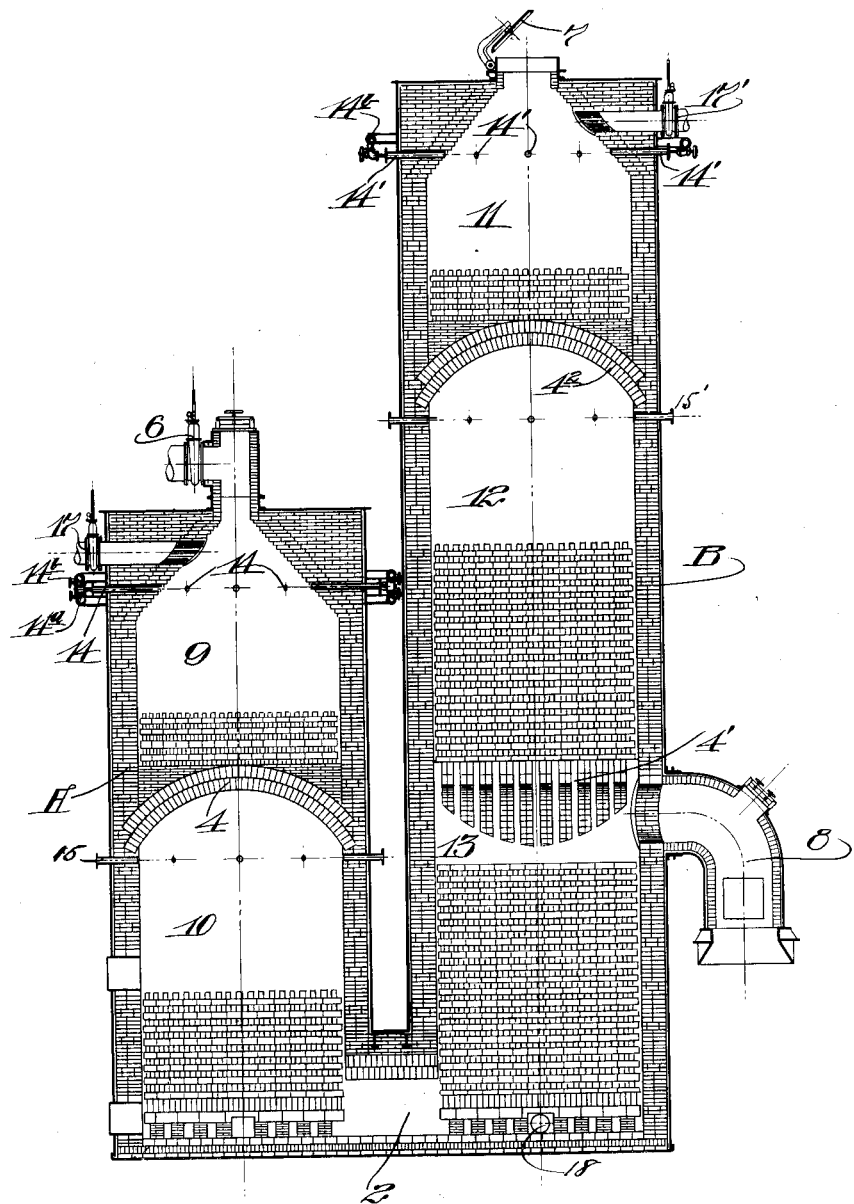
WITNESSES:
Thos. Eastberg
Charles Pickles
INVENTORS.
Edward C. Jones.
Leon B. Jones.
BY G. H. Strong.
ATTORNEY

UNITED STATES PATENT OFFICE.

EDWARD C. JONES AND LEON B. JONES, OF SAN FRANCISCO, CALIFORNIA.

METHOD OF MANUFACTURING ILLUMINATING-GAS FROM LIQUID HYDROCARBONS.

1,157,225.  Specification of Letters Patent.  Patented Oct. 19, 1915.

Application filed May 23, 1912.  Serial No. 699,132.

*To all whom it may concern:*

Be it known that we, EDWARD C. JONES and LEON B. JONES, citizens of the United States, residing in the city and county of San Francisco and State of California, have invented new and useful Improvements in Methods of Manufacturing Illuminating-Gas from Liquid Hydrocarbons, of which the following is a specification.
This invention relates to a method for producing gas from crude oil (its derivatives by distillation or residues from distillation, using them separately or combined with each other) and we declare hereby the following to be a full, clear and exact description of the invention, such as will enable others skilled in the art to which it appertains, to make and use the same.

The object of this invention is to convert into gas as much as possible of the carbon contained in crude oil or its derivatives, thus eliminating the formation of free carbon now appearing in oil gas made from crude oil, etc., as so called lampblack.
In the present process of manufacturing gas from crude oil, or its derivatives, alone, the so called cracking or the destructive distillation of the oil by high temperatures, generally between 2000°–2600° Fahrenheit, takes place in a preheated atmosphere containing deleterious combustion products such as carbon dioxid, nitrogen, etc., which non-combustible, non-heat producing, non-light producing products are in no sense a benefit to the final gas product. Further than this there is a wasteful production of uncommercial lampblack or free carbon following the cracking of the oil. On the other hand we have discovered that an entirely different result is obtained when the cracking or destructive distillation of the crude oil, or its derivatives, takes place initially and is continued in an atmosphere of active heat or light-producing gas, such as hydrogen, carbon monoxid, or a mixture of both, or any other beneficial gases which might perform the same service, including natural gas, or manufactured illuminating gas. By employing such active beneficial gases supplied from a source independent of the oil undergoing treatment, and cracking the oil in an atmosphere of such gas, or gases, in combination with steam, preferably superheated, and sufficient to satisfy the freed carbon of the oil, a far larger amount of the carbon in the oil is converted into desirable gas, and the small portion not gasified appears as tar, a complex hydro-carbon product more desirable commercially than lampblack.

Our invention, therefore, consists of the use of an active gas or gases, such as hydrogen or other gases containing hydrogen, free or in combination, as can be dissociated to produce a suitable atmosphere to act as a catalyzing agent for the destructive distillation of oil for the production of illuminating gas.

The sectional view in the accompanying drawing illustrates an oil gas set or apparatus showing the way in which our invention may be suitably employed for the production of oil gas from crude oil or its derivatives.

This apparatus consists of two generators A and B, cylindrical in shape, one generator B being much longer than the other and connected at the bottom by a rectangular throat piece 2. These generators are lined with fire brick or other refractory material and are so divided, by arches as to form chambers 9, 10, 11, 12, and 13; and the space between the chambers is loosely piled with checker work of firebrick, or other refractory material which acts as reservoirs of heat. At the top of the short shell A is located a valve 6, for the admission of air under pressure to aid combustion of oil used for heating the apparatus. At or near the middle of the longer generator B is located the common outlet 8, for gas from both generators. At the top of the longer generator B is located a stack valve 7, for the escape of the products of combustion from the oil used to heat the apparatus. At the bottom of generator B is located an opening 18 suitably controlled by a valve, not shown, for the admission of air during the heating period for the better control of the heat.

The operation of our invention is as follows: The interior checker work and chambers of the apparatus are first heated to gas making temperature by suitable means, preferably by the combustion of oil admitted through pipe 14 from pipe 14ª, to the top of the short generator A; sufficient air for combustion being admitted through valve 6. During this heating operation the gas outlet 8 is closed by a suitable hydraulic seal, not shown, and the stack valve 7 is opened to allow for the escape of the products of combustion. The resultant heat is transmitted to and stored in the checker brick and arches contained in the apparatus until the temperature reaches a point suitable for the destructive distillation of oil, preferably 1900° to 2500° Fahrenheit. Valve 6 is then closed, thereby shutting off the air for combustion, the oil for heating is shut off at pipes 14 and valve 7 is closed. The apparatus is then ready to make gas. During the heating process, oil is wholly or partly consumed in chamber 9 and a by-product of the combustion composed of carbon and generally known as lampblack is deposited upon the checker brick sustained by the arches 4, 4' and 4².

To make illuminating gas, an active gas such as hydrogen, or a mixture of hydrogen and carbon monoxid, is brought from some suitable source through pipes 17—17' into chambers 9 and 11, in company with sufficient steam through pipes 14—14' from pipe 14$^b$, and passing downward replaces the deleterious products of combustion (left in the generator from the heating operation) and form an initial and continuous superheated atmosphere of an active gas or gases for the destructive distillation of oil in chambers 10 and 12; or, steam alone may be injected into chambers 9 and 11 through pipes 14—14', some of which is dissociated in the presence of the incandescent carbon remaining upon the checker work, from the previous combustion of oil for heating the apparatus. The blue water gas formed in this way together with the remaining steam in a highly superheated condition, enters chambers 10 and 12 and produces an initial and continuous hydrogen atmosphere to act upon the destructive distillation of oil in these chambers; or, natural gas or manufactured gas, together with sufficient steam may be admitted from some outside source into chambers 9 and 11 to produce the desired active atmosphere in chambers 10 and 12. The hydrocarbons of such gases will be broken down and recombined in the presence of the incandescent carbon remaining on the checker work from the combustion of the previous heating operation, into suitable gases for the successful carrying out of our invention and passing downward into chambers 10 and 12 will form an initial and continuous atmosphere of active gases for the destructive distillation of oil in chambers 10 and 12.

The inert gases of combustion resulting from the preliminary heating of the apparatus being displaced by the active atmosphere, which atmosphere, it is to be understood, is maintained during the gas making period, hot oil is then injected through pipes 15—15', preferably in a finely atomized state, and this oil, decomposing in the presence of the hydrogen and carbon monoxid and superheated steam, passes downward through the checker brick in the bottom of the short shell A through throat-piece 2 and upward through the checker brick at the bottom of the long shell into chamber 13, thence through the outlet pipe 8 through said suitable hydraulic seal. At the same time oil is admitted through pipes 15' into chamber 12 where it is decomposed in the active atmosphere prevalent in the checker brick sustained by arch 4², and passes downward through checker brick sustained by arch 4' where the gas is fixed, and passes downward into chamber 13 then out through the outlet elbow 8 through the aforesaid suitable hydraulic seal.

It is understood that after a certain length of time the apparatus cools, whereupon there follows a heating period, as first described; the heating and gas making periods continuing alternately in the regular cycle of operation.

The machinery and plan of operation as described, represent only one type which may be used for the carrying out of our invention. We, of course, do not bind ourselves to this one type, but can make use of any apparatus or combination of apparatus for the production of the catalytic agents as well as its application in our invention or for the destructive distillation of liquid hydrocarbons, which enables us to carry out the principle of our invention successfully.

This process is to be distinguished from the old well known method of enriching water gas by a relatively small quantity of oil gas (to enhance the candle power of the blue flame of the water gas.) In that case the base or vehicle is the water gas and the oil gas is a subsidiary feature of the final contents.

Our process is primarily the use of oil gas (which is rich in carbon) as a base, or vehicle, and the use of a relatively small quantity of water gas as an active agent, whereby not only a better product of illuminating gas is obtained than under the old method, but no lampblack is formed.

Having thus described our invention, what we claim and desire to secure by Letters Patent, is—

The process of manufacturing gas from liquid hydrocarbon which consists in first heating a suitable heat retaining chamber, secondly shutting off the source of said heat and then for a period of the run introducing an active heat producing gas together with steam to form an active atmosphere to remove the deleterious products of combustion left in the heat retaining chamber after the heating operation, and thirdly injecting liquid hydrocarbon into said chamber filled with said active gases to be initially acted upon by the atmosphere of active gases produced during the second step of the process, and at the same time maintaining throughout this period an active atmosphere whereby the liquid hydrocarbon is converted into a fixed gas.

In testimony whereof we have hereunto set our hands in the presence of two subscribing witnesses.

EDWARD C. JONES.
LEON B. JONES.

Witnesses:
J. G. BUBB,
A. H. CAINE.